United States Patent
Faulkner

(10) Patent No.: US 11,376,772 B2
(45) Date of Patent: Jul. 5, 2022

(54) LIGHT WEIGHT MOLD SUPPORT STRUCTURE IN A SINGLE DUAL INJECTION MOLDING MACHINE

(71) Applicant: F&S Tool, Inc., Erie, PA (US)

(72) Inventor: James D. Faulkner, Erie, PA (US)

(73) Assignee: F&S TOOL, INC., Erie, PA (US)

( * ) Notice: Subject to any disclaimer, the term of this patent is extended or adjusted under 35 U.S.C. 154(b) by 0 days.

(21) Appl. No.: 16/274,744

(22) Filed: Feb. 13, 2019

(65) Prior Publication Data

US 2019/0248053 A1 Aug. 15, 2019

Related U.S. Application Data

(60) Provisional application No. 62/630,143, filed on Feb. 13, 2018.

(51) Int. Cl.
| | |
|---|---|
| B29C 45/17 | (2006.01) |
| B29C 33/24 | (2006.01) |
| B29C 45/26 | (2006.01) |
| B29C 45/22 | (2006.01) |

(52) U.S. Cl.
CPC .......... B29C 45/1744 (2013.01); B29C 33/24 (2013.01); B29C 45/1743 (2013.01); B29C 45/22 (2013.01); B29C 45/2602 (2013.01)

(58) Field of Classification Search
CPC . B29C 45/1744; B29C 45/1743; B29C 45/22; B29C 45/2602; B29C 33/24
See application file for complete search history.

(56) References Cited

U.S. PATENT DOCUMENTS

| | | | |
|---|---|---|---|
| 3,817,679 A | | 6/1974 | Ruegg |
| 4,444,711 A | * | 4/1984 | Schad .................. B29C 45/045 264/243 |
| 4,613,475 A | * | 9/1986 | Hettinga ............. B29C 45/1744 264/328.1 |
| 4,615,857 A | * | 10/1986 | Baird ...................... B29C 43/32 425/408 |
| 4,968,243 A | | 11/1990 | Sorensen |
| 5,817,345 A | | 10/1998 | Koch et al. |

(Continued)

FOREIGN PATENT DOCUMENTS

| | | |
|---|---|---|
| FR | 2 372 019 A1 | 6/1978 |
| JP | 2004-098427 A | 4/2004 |

(Continued)

OTHER PUBLICATIONS

International Search Report received in related International Application No. PCT/US2019/017710 dated Apr. 23, 2019.

(Continued)

*Primary Examiner* — Nahida Sultana
(74) *Attorney, Agent, or Firm* — The Marbury Group, PLLC

(57) ABSTRACT

What is presented is a mold support structure in a single dual injection molding machine for plastic part formation having at least two injection units. The mold support structure comprises at least one pair of platens located on opposite sides. Each pair of platens is separated by a plurality of reinforcement structures that provide support in the direction in which clamp and injection pressure is applied to the pair of platens during plastic part formation.

17 Claims, 5 Drawing Sheets

(56) References Cited

U.S. PATENT DOCUMENTS

| | | | | |
|---|---|---|---|---|
| 6,027,329 | A * | 2/2000 | Nazarian | B29C 45/1744 264/219 |
| 9,718,227 | B2 * | 8/2017 | Armbruster | B29C 45/1418 |
| 9,895,832 | B2 * | 2/2018 | Takatori | B29C 45/73 |
| 2004/0131724 | A1 * | 7/2004 | Fischbach | B29C 45/1744 425/595 |
| 2006/0244178 | A1 * | 11/2006 | Armbruster | B29C 45/045 264/255 |
| 2007/0290119 | A1 * | 12/2007 | Cerniglia | B29C 45/17 249/67 |
| 2011/0268834 | A1 * | 11/2011 | Schad | B29C 45/6728 425/595 |
| 2011/0316196 | A1 * | 12/2011 | Altonen | B29C 45/17 264/328.7 |
| 2013/0243899 | A1 * | 9/2013 | Babin | B29C 45/2735 425/549 |
| 2013/0255902 | A1 * | 10/2013 | Tomioka | B22D 17/00 164/154.8 |
| 2013/0307191 | A1 * | 11/2013 | Polk, Jr. | B29C 48/07 264/328.2 |
| 2014/0120193 | A1 * | 5/2014 | Maruyama | B29C 45/1751 425/150 |
| 2014/0319732 | A1 * | 10/2014 | Olaru | B29C 45/7207 264/328.16 |
| 2014/0335219 | A1 * | 11/2014 | Altonen | B29C 33/3828 425/576 |
| 2016/0082638 | A1 * | 3/2016 | Altonen | B29C 45/76 264/328.1 |
| 2017/0144349 | A1 * | 5/2017 | Ware | B29C 45/2675 |
| 2017/0182690 | A1 * | 6/2017 | Schad | B29C 45/0441 |

FOREIGN PATENT DOCUMENTS

| | | |
|---|---|---|
| WO | 2015/121132 A1 | 8/2015 |
| WO | 2017/072287 | 5/2017 |

OTHER PUBLICATIONS

International Preliminary Report on Patentability and Written Opinion of the International Searching Authority received in related International Application No. PCT/US2019/017710 dated Aug. 18, 2020.

Written Opinion of the International Searching Authority received in related International Application No. PCT/US2019/017710 dated Apr. 23, 2019.

Extended European Search Report from the European Patent Office in related Application No. 19753977.8-1014/3752331 PCT/US2019/017710 dated Oct. 4, 2021.

* cited by examiner

LIGHT WEIGHT MOLD SUPPORT STRUCTURE IN A SINGLE DUAL INJECTION MOLDING MACHINE

BACKGROUND

Injection molding is a manufacturing process for producing parts by injecting molten material into a mold. Injection molding machines comprise various components that work together to ultimately form a plastic part that is ejected from the mold. The basic parts of the mold that comprises two mold halves into which a cavity is created and an ejector system for removal of the finally formed part. The mold halves are mounted to platens that support the mold halves on the injection molding machine. In two-mold or dual injection molding machines, two separate molds are mounted in a linear fashion to a single injection molding machine with separate injection units on either side of two molds that each supply one or the other mold. The center support structure between the two molds in the dual injection molding machine is usually a solid casting or block of steel or aluminum that is milled to serve as platens and onto which mold halves are mounted. These solid castings are extremely heavy and impose significant operational difficulties. What is presented is a light weight mold support structure for dual injection molding machines.

SUMMARY

What is presented is a mold support structure in a single dual injection molding machine for plastic part formation having at least two injection units. The mold support structure comprises at least one pair of platens located on opposite sides. Each pair of platens is separated by a plurality of reinforcement structures that provide support in the direction in which clamp and injection pressure is applied to the pair of platens during plastic part formation.

In some embodiments, each platen has an associated ejector system that is mounted to the reinforcement structures. In embodiments of injection molding machines that have two pairs of platens, the second pair of platens is oriented perpendicular to the first pair of platens. In various embodiments the reinforcement structures are pillars, blocks, plates, or tubes and can have cross-sections that are circular or polygons.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
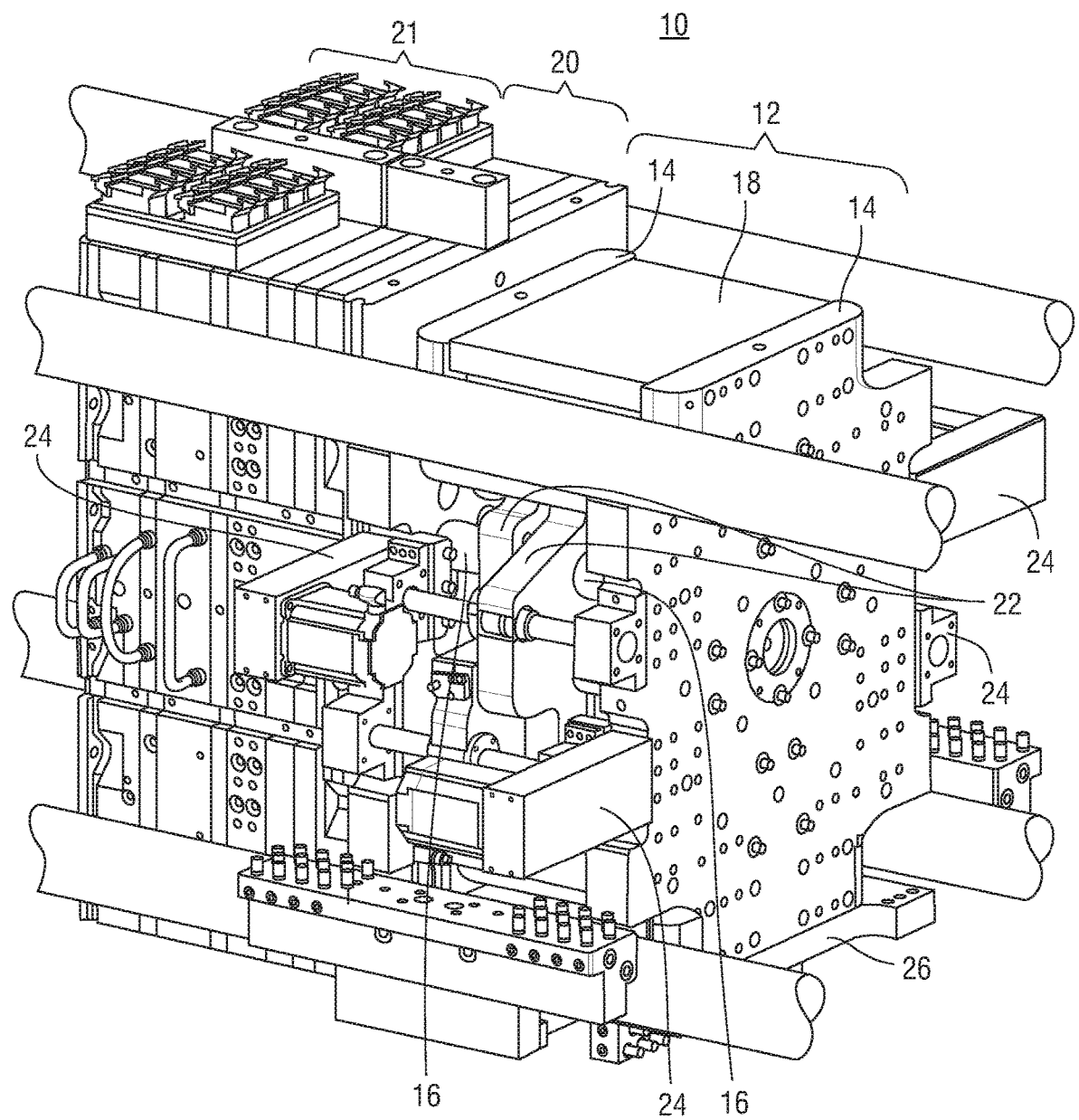
FIG. 1 shows one of two molds secured to the center mold support structure section of a two-mold injection molding machine.

Referring to the drawings some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Injection molding machines typically comprise molds that have channels from an injection unit that is the source of molten plastic. The channels lead to a cavity that is shaped into the form of the final molded part. Molten plastic is injected through these channels into the cavity to create the final molded part. The mold is typically of two parts that are split along a line of the final molded part that would allow for the separation of the part from the mold. One of the two mold halves is typically mounted to connect to the injection unit and the other mold half is typically mounted to a support platen that is mounted to a mold support structure of some sort.

There are a variety of types of injection molding machines. These include single mold machines with one or more injection units (the injection unit heats the plastic and forces it into the mold) and two mold machines with two or more injection units. The single mold machines would typically include stack and cube molds with or without additional movement for subsequent plastic injection or assembly. Stack molds comprise two or more generally linear levels of mold cavities that are fed by a single injection unit for each type or color of plastic entering the mold. Cube molds comprise stationary and moving mold cavities in which a portion of the mold rotates to potentially save cycle time, accept another plastic material, assembly, or ejection and are fed by one or more injection units.

Two-mold machines have two or more injection units in opposition. The "B" side of each mold is attached to an ejector system. The center mold support structure, or "tombstone", supports the clamp pressure of both molds and provides a method of ejecting parts from both molds. In a two-mold machine the molds could be the same or different. The stack height of each mold could be the same or different. In cube molds, the center mold support structure has two pairs of platens and each platen supports a mold half. During part formation, the cube mold rotates that could save cycle time.

In all the various types on injection molding machines, there is a premium on the space and weight of the various machine components. Typically, the center mold support structure in single dual injection molding machines are solid castings or blocks of steel or aluminum that are milled to have mold service channels for air, hydraulics, electrical connections, etc. One of the advantages of center mold support structure being solid blocks of metal is that the mold support structure can withstand the high pressures imparted by the injection unit during part formation with the least amount of deflection. However, this comes at the cost of the injection molding machine having to be sized and built to support and move the weight of the solid block of metal.

The light weight mold support structure presented herein is an assembled structure that can support molding forces with the least amount of support material to result in the lightest possible structure. The mold support structure is ideal for dual injection molding machines that have stack molds or cube molds. FIG. 1 shows a portion of a single dual injection molding machine 10 for plastic part formation. A central mold support structure 12 comprises a pair of platens 14 located on opposite sides. Each pair of platens 14 is separated by a plurality of reinforcement structures that provide support in the direction in which clamp and injection pressure is applied to the pair of platens 14 during plastic part formation. In the example shown in FIG. 1, the reinforcement structures are a plurality of pillars 16 and blocks 18 (shown in more detail later). The dual injection molding machine 10 has at least two injection units for plastic part formation. FIG. 1, shows a portion of one injection unit on the left side of the figure. FIG. 1 also shows one of two mold halves 20 secured to the left side platen 14 of the mold support structure 12 with a corresponding second mold half 21 secured to the first mold half 20 so that it is in the "closed" position. A second mold (not shown) would be secured to the platen 14 on the right side. The assembled mold support structure is mounted to a baseplate 26. The assembled mold support structure 12 allows each platen 14 to have an associated ejector system that is mounted to the reinforcement structures. In FIG. 1, each platen has its own ejector plate 22 with associated ejector actuation systems 24.

Figure 2:
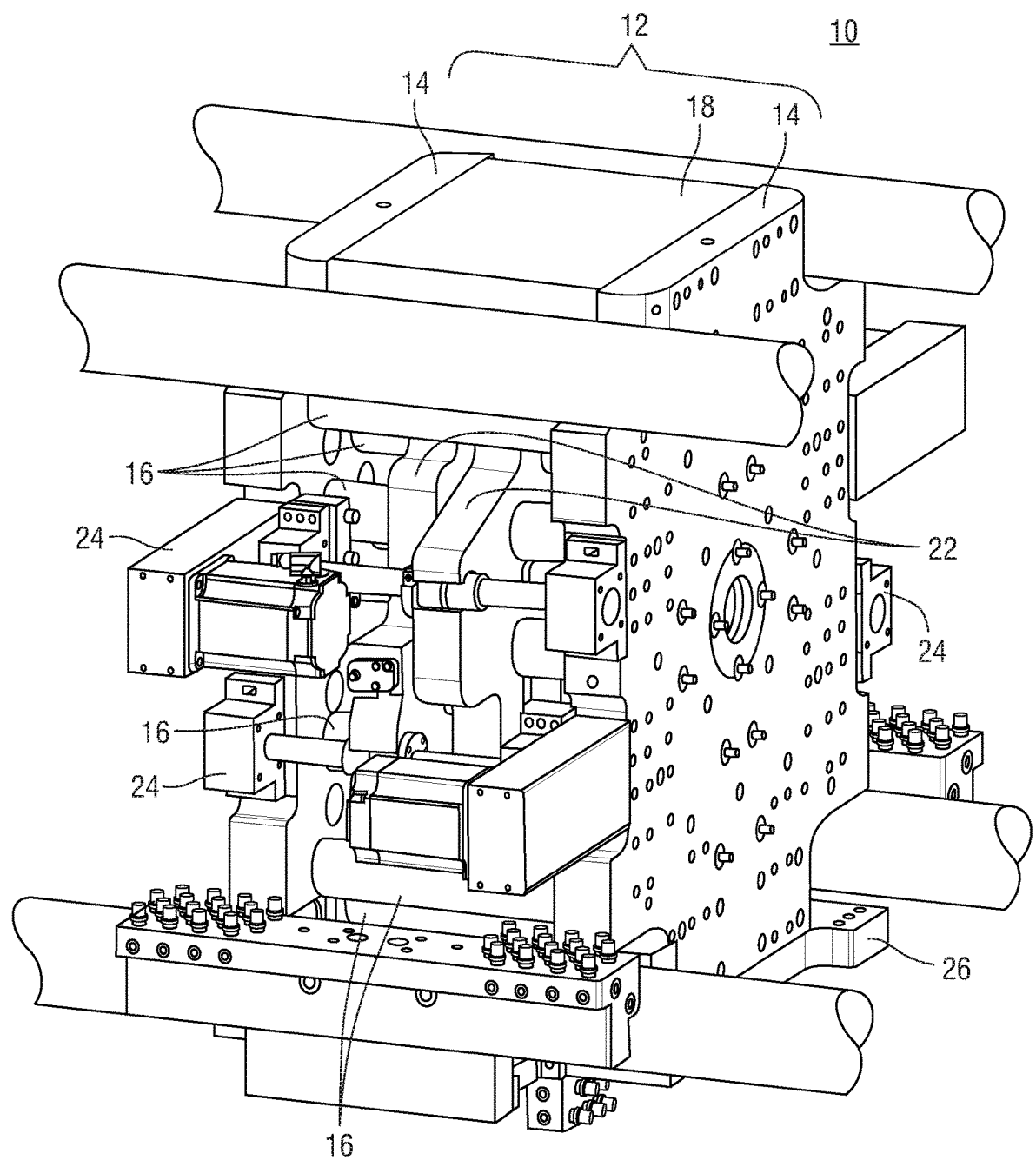
FIG. 2 shows the center mold support structure for use in a two-mold injection molding machine.

FIG. 2 shows a slightly different view of a portion of the single dual injection molding machine 10 of FIG. 1. The reinforcement structures are more easily discerned in this view and can be seen to span between the pair of platens 14. The pillars 16 allow for equipment to be mounted to them. The associated ejector plates 22 and ejector actuation systems 24 can be mounted to various components of the mold support structure 12.

Figure 3:
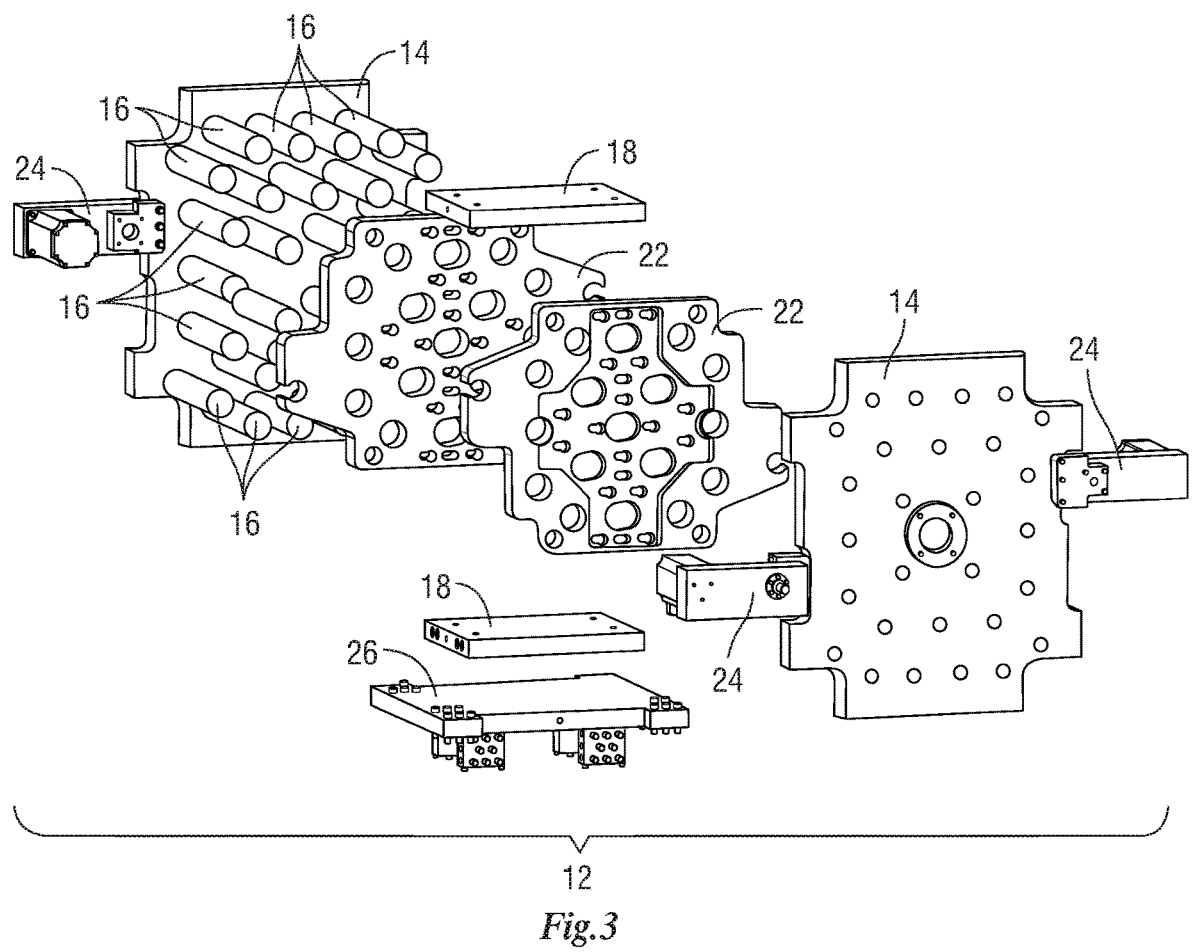
FIG. 3 is an abbreviated exploded view showing portions of the center mold support structure.

FIG. 3 shows a simplified partially exploded view of the mold support structure 12. The reinforcement structures are mounted to one platen 14 with bolts or other securing systems. The reinforcement structures are oriented in the direction in which clamp and injection pressure is applied to the pair of platens during plastic part formation. In the embodiment shown, the reinforcement structures are a combination of solid pillars 16 and blocks 18. Other geometries such as tubes and plates would also be effective. The pillars 16 shown have a circular cross-section but it is understood that other geometries may also be used such as squares, rectangles, or other polygons. The number and arrangement of reinforcement structures is determined by the type of material used to create them and the expected injection mold pressures that will be experienced during part formation. A variety of metals, alloys, carbon fiber derivatives, or combinations thereof could be used for the reinforcement structures. A finite element analysis would need to be conducted to ensure that the selected materials are not crushed under the molding pressures.

With the reinforcement structures, in this case the pillars 16 and blocks 18, mounted to the first platen 14, the ejector plates 22 are mounted directly onto the pillars 16 with associated ejector actuation systems 24 mounted to the respective platen 14. The opposing platen 14 is mounted to the pillars 16 and blocks 18 and the entire assembled mold support structure is mounted to the baseplate 26 for installation on an injection molding machine. It will be understood that the various structures for the mold system can vary from what is shown. The specific type of ejector systems does not have to be as shown. It also doesn't have to be an ejector system, but it could be other systems and they do not have to be mounted within the mold support structure 12 but could be mounted to the platens 14. The figures merely illustrate one example of equipment that could be mounted within the mold support structure 12 and are not meant to limit the scope of what is actually possible with this system.

Figure 4:
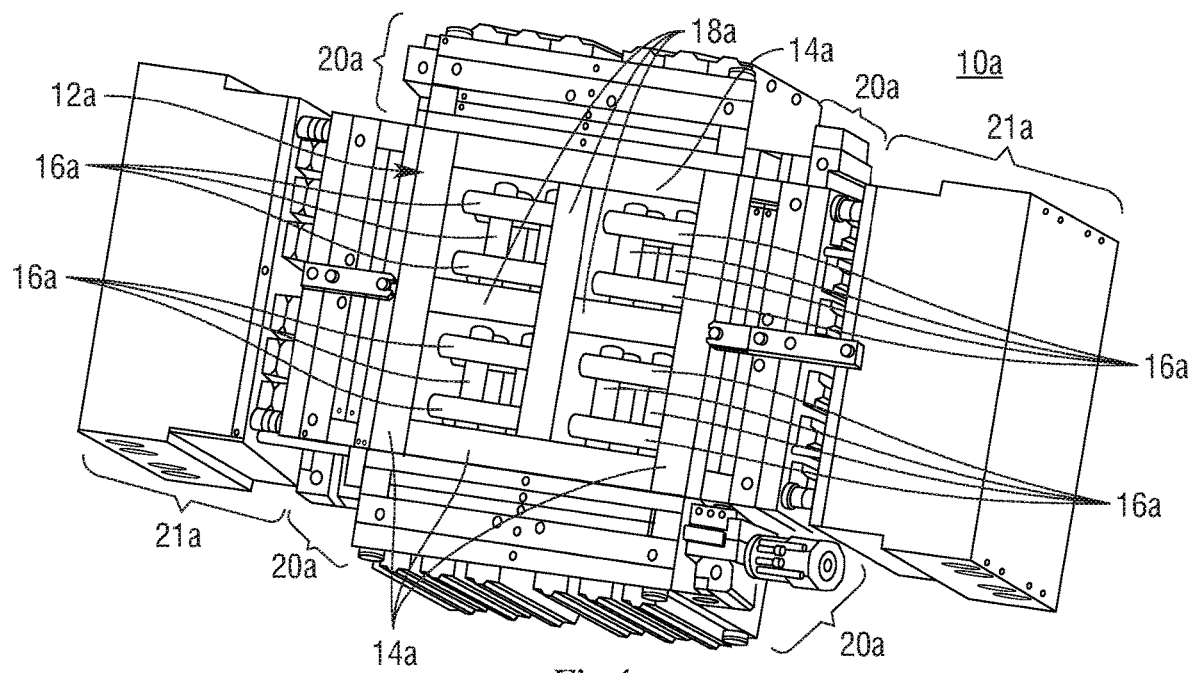
FIG. 4 is a top perspective view of a cube center mold support structure showing two pairs of platens each with mold halves installed.

FIG. 4 shows a top view of a portion of an injection molding machine 10a with a cube center rotating mold support structure 12a comprising two pairs of platens 14a in which the second pair of platens 14a is oriented perpendicular to the first pair of platens 14a. All of the platens 14a have mold halves 20a mounted to them and two of the platens 14a are shown in the "closed" position with two corresponding mold halves 21a secured to them as would be seen in the injection molding process. In this orientation, the reinforcement structures are visible as a plurality of pillars 16a and blocks 18a that are oriented to support each platen 14a to which they are connected in the direction in which clamp and injection pressure is applied to the respective pair of platens 14a during plastic part formation.

Figure 4A:
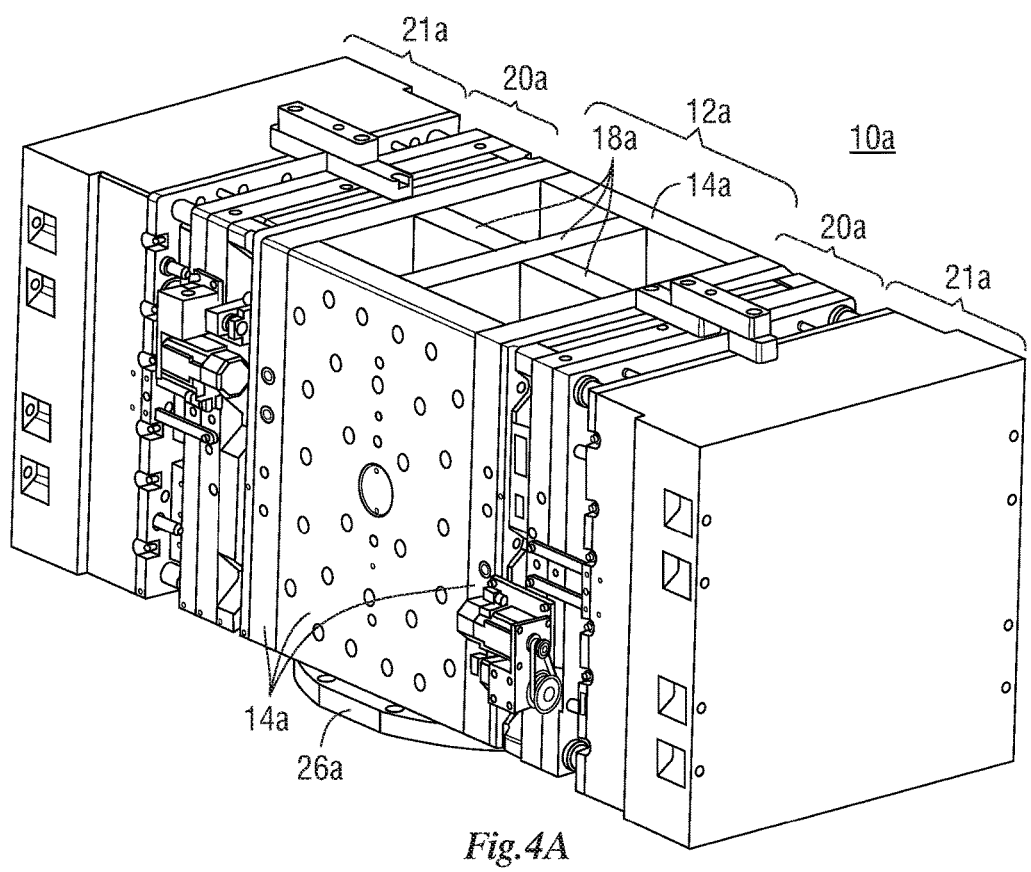
FIG. 4A is another perspective view of a cube center mold support structure with two pairs of platens with mold halve installed on one pair of platens and the second pair of platens unoccupied.

FIG. 4A shows a different angle of the injection molding machine 10a in which the two of the platens 14a have mold halves 20a and 21a mounted to them in the "closed" position. The other two platens 14a are unoccupied showing where a mold half would be mounted. The baseplate 26 is visible in this orientation.

Figure 5:
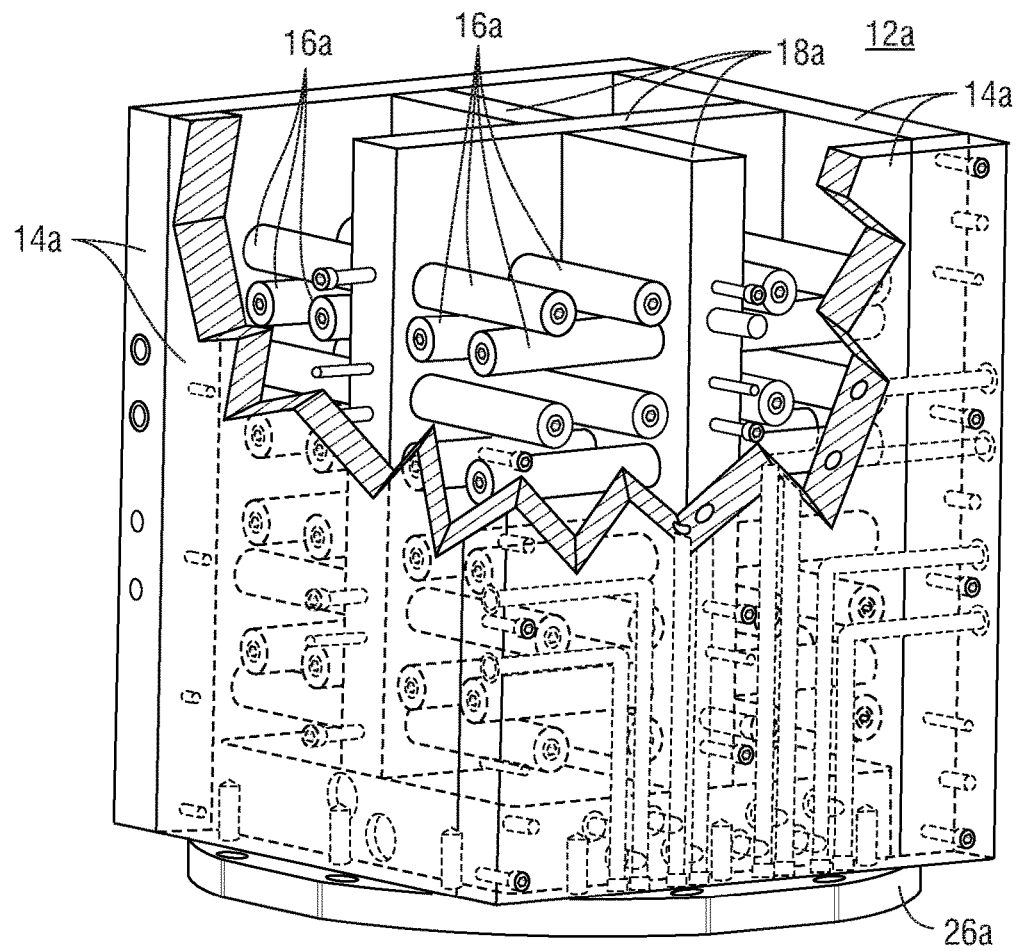
FIG. 5 is a view of a cube center mold support structure showing partially cut-out and partially transparent platens to show the interior portions of the mold support structure.
Figure 5A:
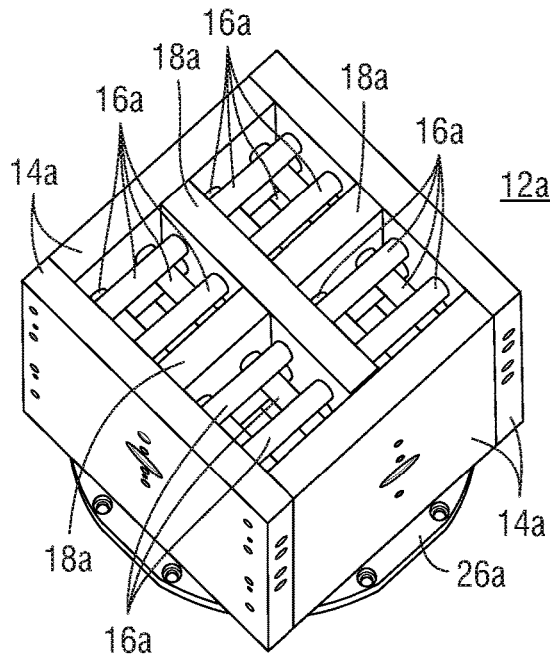
FIG. 5A a top perspective view of the cube center mold support structure of FIG. 5.
Figure 5B:
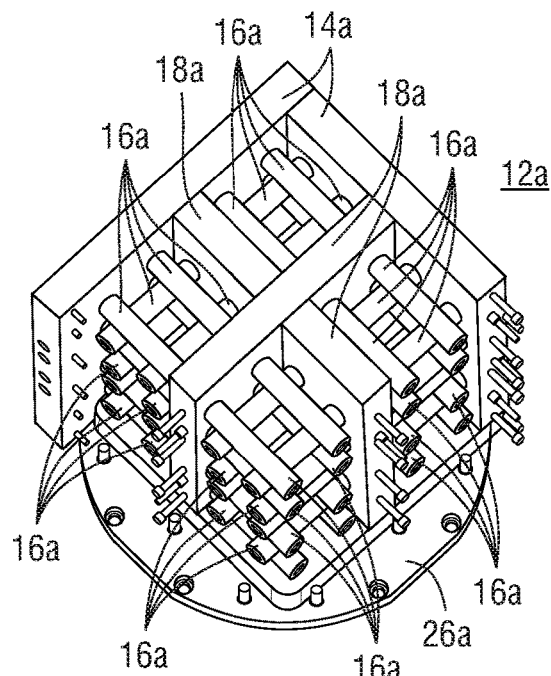
FIG. 5B a top perspective view of the cube center mold support structure of FIG. 5A with two adjacent platens removed to show the internal structure more clearly.

FIGS. 5, 5A, and 5B show different perspectives and cut-out views of the cube mold support structure 12a. The reinforcement structures are mounted to each platen 14a with bolts or other securing systems. The reinforcement structures are oriented in the direction in which clamp and injection pressure is applied to the pair of platens during plastic part formation. In the embodiment shown, the reinforcement structures are a combination of solid pillars 16a and blocks 18a. Other geometries such as tubes and plates would also be effective. The pillars 16a shown have a circular cross-section but it is understood that other geometries may also be used such as squares, rectangles, or other polygons. The number and arrangement of reinforcement structures is determined by the type of material used to create them and the expected injection mold pressures that will be experienced during part formation. A variety of metals, alloys, carbon fiber derivatives, or combinations thereof could be used for the reinforcement structures. A finite element analysis would need to be conducted to ensure that the selected materials are not crushed under the molding pressures.

The embodiment of mold support structure 12a shown does not include any integrated structures for the mold system. However, it is possible that various appurtenances could be mounted within the mold support structure 12a. Such other systems could instead be mounted directly to the platens 14a. The figures merely illustrate one example of the mold support structure 12a and are not meant to limit the scope of what is actually possible with this system.

With mold support structures constructed as taught herein, it is possible to achieve weight reductions of 40% over standard solid center mold support structures. Theses structure provide superior support for the least amount of injection force deflection, especially when comparing an all-steel lightweight center section support structure with an all-aluminum center section. The assembled structures offer simplification and cost reduction of routing the center section mold services for air, hydraulics, electrical, etc.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A mold support structure for a molding machine having at least two injection units, said mold support structure comprising:
   a plurality of reinforcement structures; and
   a first pair of platens,
   wherein each platen of said first pair of platens is separated from the other platen of said first pair of platens by said plurality of reinforcement structures,
   wherein said plurality of reinforcement structures support said first pair of platens fixed separate from one another in a direction in which clamp and injection pressure is applied to said first pair of platens during plastic part formation,
   wherein each reinforcement structure is elongate, with a respective longitudinal dimension in a direction intersecting said first pair of platens, and
   wherein one or more of said plurality of reinforcement structures resist movement of said first pair of platens toward one another along the respective longitudinal dimensions of the one or more of said plurality of reinforcement structures in response to pressure on each one of said first pair of platens in a respective direction toward said plurality of reinforcement structures.

2. The mold support structure of claim 1 wherein said plurality of reinforcement structures are one of pillars, blocks, or tubes.

3. The mold support structure of claim 1 wherein said plurality of reinforcement structures have cross-sections that are circular or polygons.

4. The mold support structure of claim 1 further comprising a second pair of platens supported by the plurality of reinforcement structures, wherein said second pair of platens is oriented perpendicular to said first pair of platens.

5. The mold support structure of claim 1 further comprising an ejector system associated with each platen of said first pair of platens and mounted to said plurality of reinforcement structures, between said first pair of platens.

6. A mold support structure comprising:
   a first platen releasably securable to half of a first mold;
   a second platen parallel to the first platen, the second platen releasably securable to half of a second mold; and
   a plurality of reinforcement structures spanning between the first platen and the second platen,
   wherein the plurality of reinforcement structures support the first platen and the second platen fixed separate from one another in a direction in which clamp and injection pressure is applied to the first platen and the second platen during plastic part formation,
   wherein the plurality of reinforcement structures resist movement of the first platen and the second platen toward one another in response to pressure on each of the first platen and the second platen in a respective direction toward the plurality of reinforcement structures, and
   wherein the plurality of reinforcement structures are spaced relative to one another such that the plurality of reinforcement structures define void space between the first platen and the second platen.

7. The mold support structure of claim 6, wherein the plurality of reinforcement structures collectively resist movement of the first platen and the second platen toward one another in a direction perpendicular to the first platen and the second platen.

8. The mold support structure of claim 6, wherein the first platen and the second platen each have a respective planar surface facing away from the plurality of reinforcement structures spanning between the first platen and the second platen.

9. The mold support structure of claim 8, wherein:
   the first platen is releasably securable to half of the first mold along the respective planar surface of the first platen; and
   the second platen is releasably securable to half of the second mold along the respective planar surface of the second platen.

10. The mold support structure of claim 6, wherein at least one reinforcement structure of the plurality of reinforcement structures is elongate with a longitudinal dimension in a direction intersecting the first platen and the second platen.

11. The mold support structure of claim 6, wherein at least one of the plurality of reinforcement structures is parallel to another one of the plurality of reinforcement structures in a direction from the first platen to the second platen.

12. The mold support structure of claim 6, further comprising a third platen and a fourth platen, the third platen and the fourth platen each perpendicular to the first platen and to the second platen.

13. The mold support structure of claim 12, wherein:
   the plurality of reinforcement structures are disposed between the third platen and the fourth platen; and
   the plurality of reinforcement structures resist movement of the third platen and the fourth platen toward one another in response to pressure on each of the third platen and the fourth platen.

14. The mold support structure of claim 12, wherein, collectively, the first platen, the second platen, the third platen, and the fourth platen collectively form a cube with the plurality of reinforcement structures disposed therein.

15. The mold support structure of claim 6, wherein a longitudinal dimension of at least one of the plurality of reinforcement structures extends in a direction intersecting the first platen and the second platen.

16. The mold support structure of claim 6, wherein the plurality of reinforcement structures include one or more of pillars, blocks, or tubes.

17. The mold support structure of claim 6, wherein the plurality of reinforcement structures collectively extend from the first platen to the second platen.

* * * * *